Patented Sept. 13, 1938

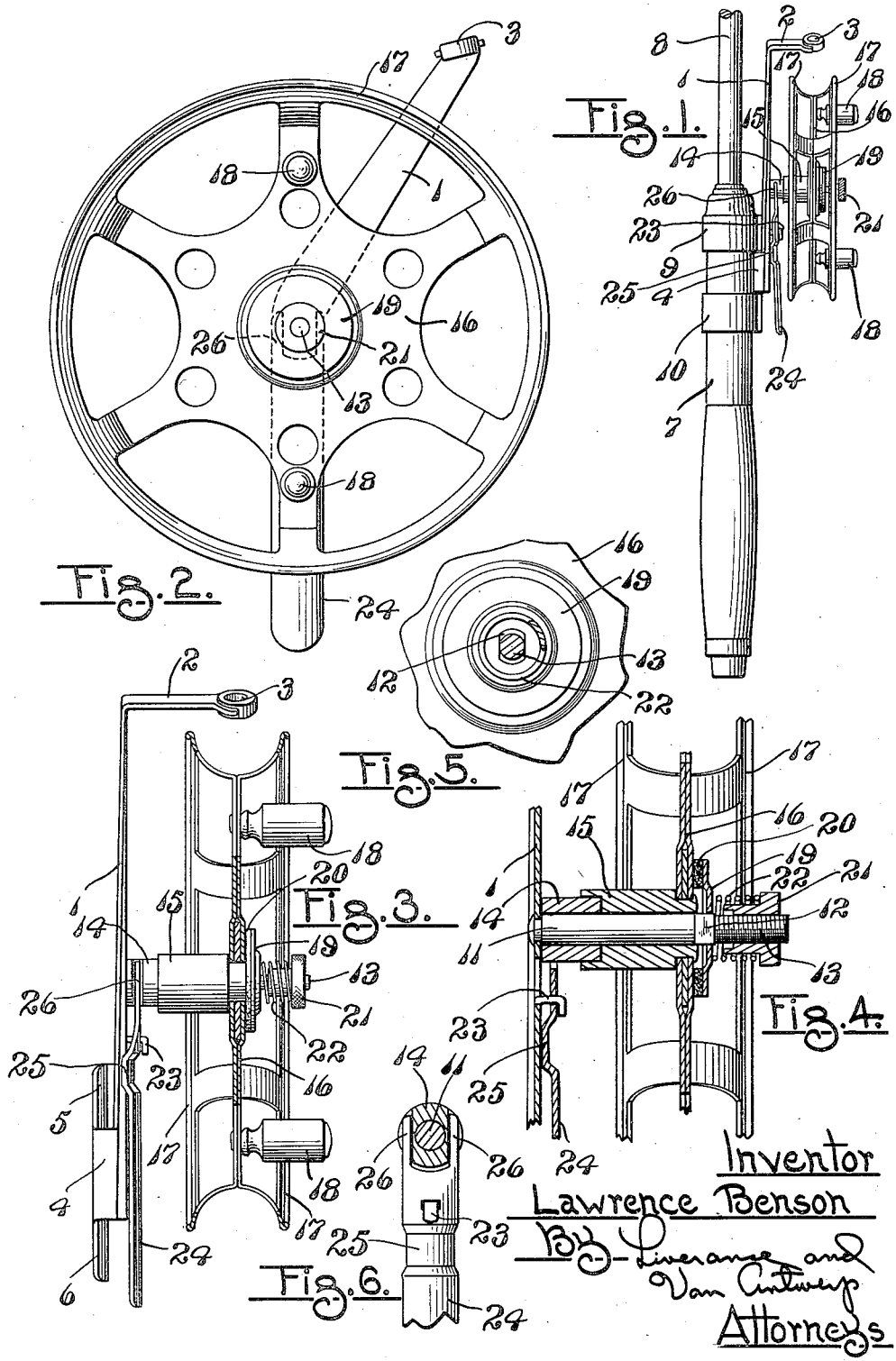

2,129,903

UNITED STATES PATENT OFFICE 2,129,903

FISH REEL BRAKE

Lawrence Benson, Wayland, Doerr Township, Allegan County, Mich.

Application May 17, 1937, Serial No. 142,991

4 Claims. (Cl. 242—84.5)

This invention relates to fishing reels and is particularly concerned with a simply constructed and very easily operated brake for the reel to check its rotation at desired times.

With my construction the reel is rotatably mounted upon a support which in turn may be detachably connected to a fishing rod. The brake is rockingly mounted upon such support and in a position that the thumb of the hand of the fisherman which grasps the handle of the rod can be readily used for pressing upon the brake whenever needed and also may be instantly released therefrom. One end of the brake lever is thus engageable by the thumb of the fisherman while the other is operatively associated with the hub of the rotating reel so as to press the same laterally and put it preferably into frictional engagement with a secondary brake which itself may be adjusted to different positions so as to govern the freedom of rotative movement of the reel when the thumb operated brake is not used, and to have its braking effect greatly increased upon operation of the thumb operated brake lever in one direction. My invention is directed to the production of a fishing reel of the character described and one which can be very readily and easily and economically produced.

For an understanding of the invention and the construction and operation thereof, reference may be had to the following description, taken in connection with the accompanying drawing, in which, Fig. 1 is an elevation showing the reel applied to a fishing rod.

Fig. 2 is an enlarged side elevation of the reel.

Fig. 3 is an enlarged elevation of the reel similar to that shown in Fig. 1 but with the central web part of the reel in vertical section.

Fig. 4 is a fragmentary section taken longitudinally through the hub of the reel and the parts associated therewith.

Fig. 5 is a fragmentary elevation and vertical section, said section being taken in a vertical plane at the outer portion of the supporting rod upon which the hub of the reel is mounted, and Fig. 6 is a vertical section taken at a plane where the brake lever engages with a collar which in turn has engagement with one end of the reel hub.

Like reference characters refer to like parts in the different figures of the drawing.

In the structure shown, a supporting bar 1 of flat metal is provided and at the upper part thereof bent at an angle to the vertical, said part at its upper end having a laterally turned arm 2 which terminates in a guiding eye 3 for the fishing line. At the lower end of the supporting bar 1 a flange 4 is bent from one edge and it in turn carries a flange having an upper projection 5 and a lower projection 6 curved to conform to the handle 7 from which the rod 8 extends as shown in Fig. 1. Such projections 5 and 6 extend, the first under a fixed sleeve 9 on the handle, and the latter under a movable sleeve 10, this being well known structure in connection with fishing rods for the attachment of reels.

A rod 11 at one end is reduced in diameter and extends through the supporting bar 1 and is riveted over to make a permanent connection therewith. Said rod extends horizontally from the supporting bar 1 and at a distance from the bar is flattened at opposite sides, as indicated at 12, and then terminates in a screw threaded section 13. A collar 14 is loosely mounted on the rod 11 having one end engaging against a side of the support 1. A hub 15 is placed over the rod 11 and at its end nearest the collar 14 is recessed so that the adjacent end portion of the collar 14 is received within the recessed end of the hub 15 as shown in Fig. 4. At the outer end of the hub 15 it is reduced somewhat in diameter and the reel is attached thereto, the reduced part of the hub passing through sheet metal webs 16 of said reel and being riveted over as shown in Fig. 4. The reel is made of two parts of sheet metal, each including a web portion 16 and with flange parts 17 which are shaped as shown so that when the two webs are placed against each other and secured together a continuous annular trough around which the line may be wound is provided between the flanges 17. Handles 18 at points diametrically opposed on the web 16 are secured thereto by riveting as shown in Fig. 3 and also serve to connect the web parts 16 of the reel together. The annular trough around the reel is located so that the line wound thereon may extend directly through the guide eye 3 previously described.

A brake is slidably mounted over the flattened portion 12 of the rod 11, including a circular sheet metal member 19 having an opening corresponding to the cross section of the part 12 of said rod and having a fabric friction shoe 20 secured at the side thereof adjacent the web of the reel. A nut 21 screws onto the outer threaded section 13 of the rod 11 between which and the plate 19 a coiled compression spring 22 is located. It is evident that by screwing the nut 21 in one direction the spring is compressed and will press the brake shoe 20 with more or less force against the web 16 dependent upon the extent to which the nut 21 is operated.

A short distance below the point where the rod 11 is attached to the support 1 a tongue 23 is struck from such support and bent at right angles toward the reel and then turned downwardly as best shown in Fig. 4. A lever 24 of sheet metal has an opening through which the tongue 23 passes. At a point slightly below the tongue the lever is formed with an offset 25 which bears against the supporting bar 1 and provides a fulcrum about which the lever 24 may be rocked. The upper end of the lever 24 is divided to make two spaced fingers 26 which extend upwardly into slots cut at opposite sides of the collar 14.

With the reel attached to the handle of the fishing rod as shown in Fig. 1 and with a line wound therearound and extending through the eye 3 the friction desired upon the reel for running out the line as in casting or the like may be controlled by adjustment of the nut 21. Whenever, for example, when a strike has occurred and a fish has been hooked, it is desired to brake the wheel so that it will resist unwinding of the line, the operator merely has to press upon the lower end of the lever 24 with his thumb to rock said lower part of the lever toward the handle 7. This rocks the lever at its upper end to move collar 14 to the right (Fig. 4) and thus move the reel slightly to the right and bring it into heavier pressing engagement against the brake shoe 20. The extent of the braking may be easily controlled by the pressure exerted by the thumb. Then in winding in the line the brake is released and the rotation of the wheel is free for such inwinding.

The construction described is very practical. It is of a simple and economical form and one which is readily manufactured. The invention is defined in the appended claims and is to be considered comprehensive of all forms of structure coming within their scope.

I claim:

1. In a fishing reel, a support, a rod attached to said support, a reel having a hub rotatably mounted on the rod, a brake mounted on said rod at one side of the reel and adapted to bear against the reel, a lever rockably mounted on said support adapted to be manually operated by pressure at one end thereof, and means interposed between the opposite end of the lever and the hub of said reel for moving said hub in a direction to press the reel against the brake including a collar loosely mounted on the rod between said support and one end of the hub and bearing against said hub.

2. A fishing reel comprising, a support, a rod connected thereto and extending at right angles therefrom, a hub rotatably mounted on the rod, a collar loosely mounted on the rod between said support and one end of the hub and bearing against said hub, manually operable means mounted on said support and connected with said collar for moving the collar in a direction away from the support, a brake non-rotatably mounted on said rod beyond said hub, and a reel connected to the outer end of said hub and movable therewith against the brake on manual operation of said manually operable means.

3. A structure of the class described comprising, a support, a rod attached thereto at one end and projecting at right angles therefrom, a collar loosely mounted on the rod having one end adjacent the support, a reel including a hub and a web extending therefrom rotatably mounted on said rod, the inner end of said hub bearing against the adjacent end of the collar, a brake mounted on said rod at the outer side of the reel, means for holding the brake against rotation, a lever rockingly mounted on said support and having a divided upper end, said collar having slots in opposite sides into which said divided parts of said upper end of the lever extend, whereby pressure on the lower end of the lever to rock the same toward the support moves said reel into pressure engagement with the brake, as specified.

4. A construction containing the elements in claim 3, said rod at its outer end being screw threaded, a nut screwed onto the outer end of said rod, and a coiled spring around the rod between said nut and the brake for adjusting said brake with respect to the reel.

LAWRENCE BENSON.